(12) United States Patent
Choi

(10) Patent No.: US 12,352,699 B2
(45) Date of Patent: Jul. 8, 2025

(54) PROTECTIVE SHEET FIXING JIG AND AUTO VISUAL INSPECTION SYSTEM INCLUDING THE SAME

(71) Applicant: Samsung Display Co., LTD., Yongin-si (KR)

(72) Inventor: Woongil Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 182 days.

(21) Appl. No.: 18/220,491

(22) Filed: Jul. 11, 2023

(65) Prior Publication Data
US 2024/0118217 A1    Apr. 11, 2024

(30) Foreign Application Priority Data
Oct. 11, 2022    (KR) .................. 10-2022-0130018

(51) Int. Cl.
*G01N 21/88*    (2006.01)
(52) U.S. Cl.
CPC ..... *G01N 21/8803* (2013.01); *G01N 21/8851* (2013.01); *G01N 2201/0245* (2013.01)
(58) Field of Classification Search
CPC ........... G01N 21/8803; G01N 21/8851; G01N 2201/0245; G01N 21/8806; G01N 21/01; G01N 21/95; G01N 21/88; B25B 11/00; H10K 71/70; H10K 71/00; G01R 31/2825; G01R 31/2844
See application file for complete search history.

(56) References Cited

U.S. PATENT DOCUMENTS

| | | | |
|---|---|---|---|
| 8,570,048 B2 * | 10/2013 | Lee | G01R 31/001 324/555 |
| 2006/0157904 A1 * | 7/2006 | Li | B25B 11/002 269/8 |

FOREIGN PATENT DOCUMENTS

| | | |
|---|---|---|
| KR | 20110037163 A | 4/2011 |
| KR | 101319842 B1 | 10/2013 |
| KR | 20-0489083 | 4/2019 |
| KR | 20040089083 | 4/2019 |
| KR | 20200043586 A | 4/2020 |
| KR | 20220012619 A | 2/2022 |

* cited by examiner

*Primary Examiner* — Seung C Sohn
(74) *Attorney, Agent, or Firm* — CANTOR COLBURN LLP

(57) ABSTRACT

A protective sheet fixing jig fixes the protective sheet placed on the stage. The protective sheet fixing jig includes: an upper plate pressing the protective sheet on the stage to tightly fix the protective sheet to the stage; a post disposed at a side of the stage and connected with the upper plate; a bracket facing the upper plate and connected with the post; and a fixing part fastened to the bracket to press a lower surface of the stage.

20 Claims, 14 Drawing Sheets

PROTECTIVE SHEET FIXING JIG AND AUTO VISUAL INSPECTION SYSTEM INCLUDING THE SAME

This application claims priority to Korean Patent Application No. 10-2022-0130018, filed on Oct. 11, 2022, and all the benefits accruing therefrom under 35 U.S.C. § 119, the content of which in its entirety is herein incorporated by reference.

BACKGROUND

(a) Field

This disclosure relates to a protective sheet fixing jig and an auto visual inspection device including the same.

(b) Description of the Related Art

Electronic devices such as display devices, semiconductor devices, solar cells, etc., may be subjected to various inspections during and after manufacturing. For example, the electronic device may be placed on a stage of the auto visual inspection device, and when the stage moves to a predetermined inspection part of the auto visual inspection device, the inspection part may perform a visual inspection by photographing the electronic device with a camera.

A protective sheet may be fixed on the stage to prevent the electronic device from being damaged, and the electronic device may be placed on the protective sheet.

An adhesive tape may be used to secure the protective sheet to the stage.

SUMMARY

The adhesive tape and the protective sheet may be desired to be replaced. For example, if the adhesive tape is aged, the fixing of the protective sheet is insufficient, or the attachment region of the adhesive tape needs to be changed, the adhesive tape must be removed and a new adhesive tape must be re-taped. In addition, when replacing the damaged protective sheet such as when it is torn or sagged, the re-taping is desired. This re-taping may increase an inspection time. In addition, since the causes of the replacement of the adhesive tape are diverse, it may be difficult to set a replacement cycle of the adhesive tape.

Embodiments are to provide a protective sheet fixing jig in which the fixing of the protective sheet and the replacement of the protective sheet are easy, and an auto visual inspection device including the same.

A protective sheet fixing jig in an embodiment of the disclosure fixes a protective sheet placed on a stage. The protective sheet fixing jig includes: an upper plate pressing the protective sheet on the stage to tightly fix the protective sheet to the stage; a post disposed at a side of the stage and connected with the upper plate; a bracket facing the upper plate and connected with the post; and a fixing part fastened to the bracket to press a lower surface of the stage.

In an embodiment, the upper plate may have an L-shaped plane shape.

In an embodiment, a plurality of fastening holes may be defined in a lower surface of the post. The protective sheet fixing jig may further include a fastening member that passes through a hole defined in the bracket and is fastened to one of the plurality of fastening holes.

In an embodiment, the protective sheet fixing jig may further include a location pin protruded downward from a lower surface of the upper plate and inserted into a groove defined at an edge of the stage.

In an embodiment, the protective sheet fixing jig may include a first fixing jig and a second fixing jig respectively fixing a first edge and a second edge of the protective sheet opposite to each other, and In an embodiment, the first fixing jig and the second fixing jig may each include the upper plate, the post, the bracket, and the fixing part.

In an embodiment, the upper plate of the first fixing jig and the upper plate of the second fixing jig may press a third edge of the protective sheet between the first edge and the second edge of the protective sheet.

In an embodiment, the upper plate of the first fixing jig and the upper plate of the second fixing jig may not press a fourth edge of the protective sheet opposite to the third edge of the protective sheet.

In an embodiment, a fastening hole may be defined in the bracket in a thickness direction of the stage. The fixing part may include a knob including an adjusting screw fastened to the fastening hole.

In an embodiment, when the adjusting screw is rotated, an end of the adjusting screw may move in the thickness direction of the stage to press the lower surface of the stage.

In an embodiment, a fastening hole may be defined in the bracket in a thickness direction of the stage. The fixing part may include a vise handle including an adjusting screw fastened to the fastening hole.

An auto visual inspection device in an embodiment of the disclosure includes: a turntable; a plurality of inspection units disposed around the turntable; a plurality of stages disposed on the turntable; a protective sheet disposed on each stage; and a protective sheet fixing jig for fixing the protective sheet. The protective sheet fixing jig includes: an upper plate pressing the protective sheet on the stage to tightly fix the protective sheet to the stage; a post disposed at a side of the stage and connected with the upper plate; a bracket facing the upper plate and connected with the post; and a fixing part fastened to the bracket to press a lower surface of the stage.

In an embodiment, the upper plate may have an L-shaped plane shape.

In an embodiment, a plurality of fastening holes may be defined in a lower surface of the post. The protective sheet fixing jig may further include a fastening member that passes through a hole defined in the bracket and is fastened to one of the plurality of fastening holes.

In an embodiment, the protective sheet fixing jig may further include a location pin protruded downward from a lower surface of the upper plate and inserted into a groove defined at an edge of the stage.

In an embodiment, the protective sheet fixing jig may include a first fixing jig and a second fixing jig respectively fixing a first edge and a second edge of the protective sheet opposite to each other. The first fixing jig and the second fixing jig may each include the upper plate, the post, the bracket, and the fixing part.

In an embodiment, the upper plate of the first fixing jig and the upper plate of the second fixing jig may press a third edge of the protective sheet between the first edge and the second edge of the protective sheet.

In an embodiment, the auto visual inspection device may further include a pin board for applying a signal to a test object placed on the stage. The upper plate of the first fixing jig and the upper plate of the second fixing jig may not press an edge of the protective sheet adjacent to the pin board.

In an embodiment, a fastening hole may be defined in the bracket in a thickness direction of the stage. The fixing part may include a knob including an adjusting screw fastened to the fastening hole.

In an embodiment, when the adjusting screw is rotated, an end of the adjusting screw may move in the thickness direction of the stage to press the lower surface of the stage.

In an embodiment, a fastening hole may be defined in the bracket in a thickness direction of the stage. The fixing part may include a vise handle including an adjusting screw fastened to the fastening hole.

By the embodiments, it is possible to provide the protective sheet fixing jig for the easy fixing of the protective sheet and replacement of the protective sheet, and the auto visual inspection device including the same. In addition, in the embodiments, there are advantageous effects that may be recognized throughout the specification.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
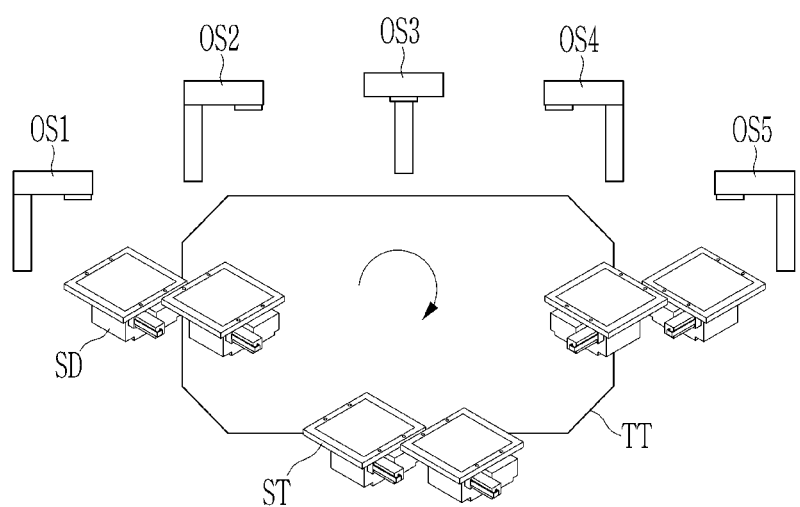
FIG. 1 is a view schematically showing an embodiment of an auto visual inspection device.

Embodiments will be described in detail with reference to accompanying drawings so that those skilled in the art can easily implement them.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, unless explicitly described to the contrary, the word "comprise" and variations such as "comprises" or "comprising" will be understood to imply the inclusion of stated elements but not the exclusion of any other elements.

Throughout the specification, "connected" does not only mean that two or more constituent elements are directly connected, but when two or more constituent elements are connected indirectly through other constituent elements, and it may include a case where substantially integral parts are connected to each other even if they may be referred to by a different name depending on the position or function, as well as the case of being physically connected or electrically connected.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

In the drawings, symbols "x", "y", and "z" representing directions are used, where "x" is a first direction, "y" is a second direction perpendicular to the first direction, and "z" is a third direction perpendicular to the first direction and the second direction.

FIG. 1 is a view schematically showing an embodiment of an auto visual inspection device.

Referring to FIG. 1, an auto visual inspection device (hereinafter, referred to "an AVI device") may include a turntable TT, a stage ST, a stage driving unit SD, and inspection units OS1 to OS5. Various inspections may be performed during or after manufacturing an object to be inspected (hereinafter, "a display device" will be described as an example). The AVI device may automatically perform several inspections to determine when the display device is defective. The AVI device may inspect characteristics, e.g., images, colors (color viewing angles), touch sensors, and appearances of the display device. The AVI device may be configured in various ways according to the inspection type.

The turntable TT may be disposed on a granite table (not shown), and may be rotated in a clockwise or counterclockwise direction. The turntable TT may transfer the inspection object placed on the stage ST to each of the inspection units OS1 to OS5.

The stage ST may be disposed on the turntable TT. The stage ST may move as the turntable TT rotates. The AVI device may include a plurality of stages ST. In an embodiment, it may include eight sets of the stages ST, and each set may include two stages ST, for example. The total number of the stages ST, the number of the stages ST included in each set, etc. may be variously changed according to the design of the AVI device. The display device (or the display panel), which is an object to be inspected, may be placed on the stage ST.

The inspection units OS1 to OS5 may be fixed at predetermined positions. In an embodiment, the inspection units OS1 to OS5 may be disposed at predetermined intervals around the turntable TT, for example. The inspection units OS1 to OS5 may include a characteristic inspection unit OS1 that inspects the characteristics of the display device, an image inspection unit OS2 that inspects the image displayed on the display device, a color inspection unit OS3 that inspects the color of the image displayed on the display device, and a touch sensor inspection unit OS4 that inspects the touch sensor of the device and/or an exterior inspection unit OS5 that inspects the exterior of the display device. The inspection target and the arrangement order of each of the inspection units OS1 to OS5 may be changed in various ways. Each of the inspection units OS1 to OS5 may include a camera, and may further include an optical unit such as a light source and a photosensor.

The AVI device may include a pin board (not shown) corresponding to each stage ST. The pin board may be disposed adjacent to the stage ST on the turntable TT and moved with the corresponding stage ST. The pin board may be connected to the display device and apply a signal to the display device. When the turntable TT rotates by a predetermined angle and the stage ST and the pin board corresponding to it move to the position where the inspection units OS1 to OS5 are disposed, the inspection units OS1 to OS5 perform a predetermined inspection on the display device placed on the stage ST.

The stage driving unit SD may be disposed below the stage ST. The stage driving unit SD may drive the stage ST to move in a first direction x, a second direction y, and/or a third direction z.

The AVI device may include a loading unit (not shown) for loading the display device to be inspected onto the stage ST and an unloading unit (not shown) for unloading the inspected display device from the stage ST.

Figure 2:
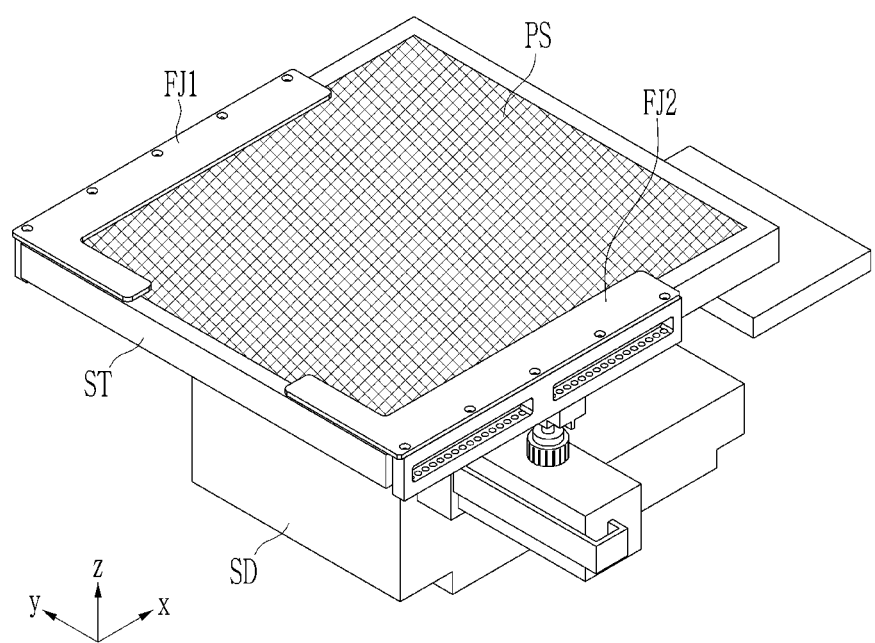
FIG. 2 is a perspective view showing an embodiment of a stage and a protective sheet fixing jig disposed (e.g., mounted) thereon in an AVI device.
Figure 3:
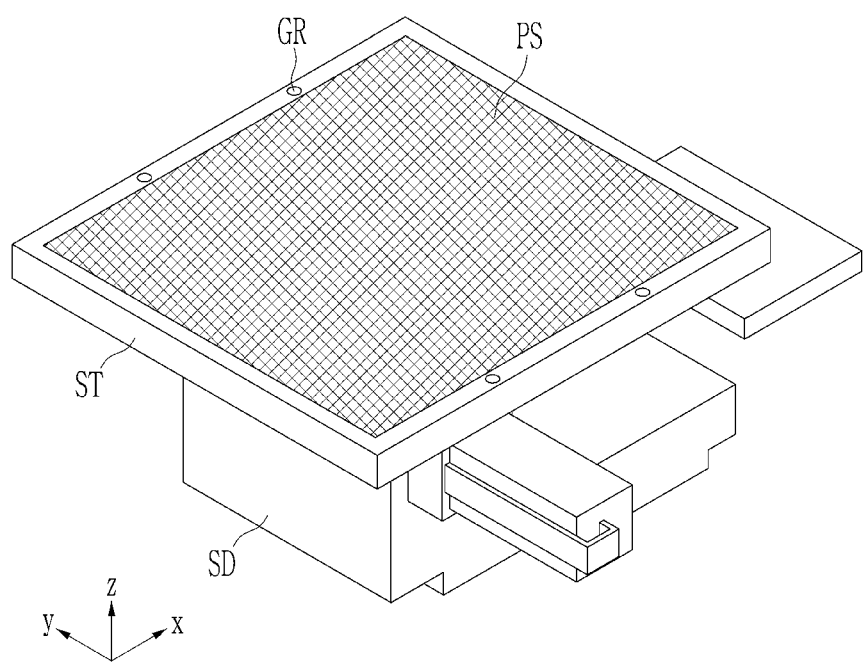
FIG. 3 is a perspective view showing a stage except for a protective sheet fixing jig in FIG. 2.
Figure 4:
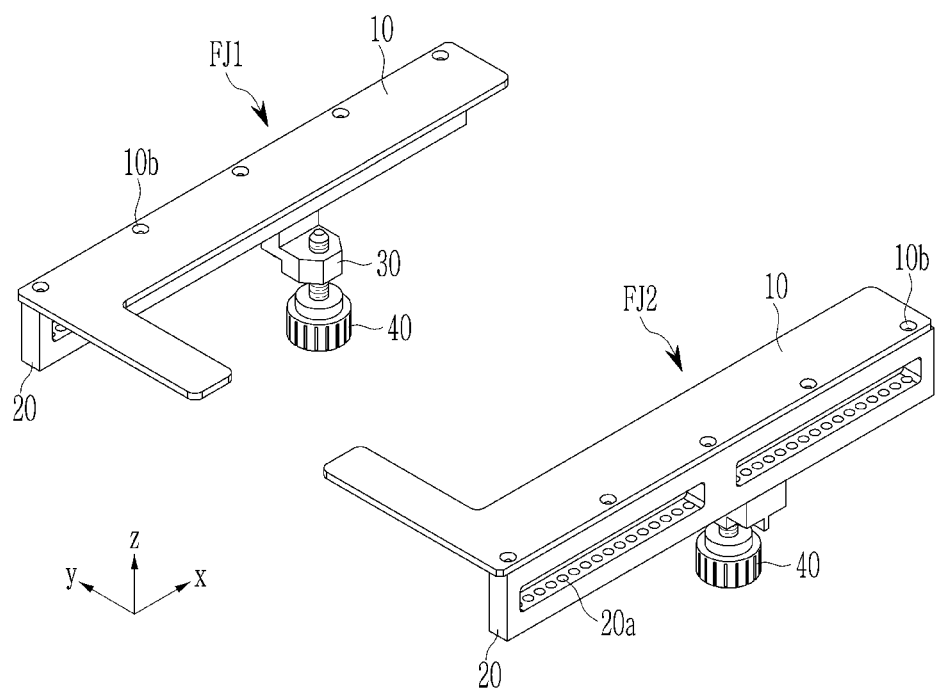
FIG. 4 is a perspective view showing a protective sheet fixing jig separated from FIG. 2.
Figure 5:
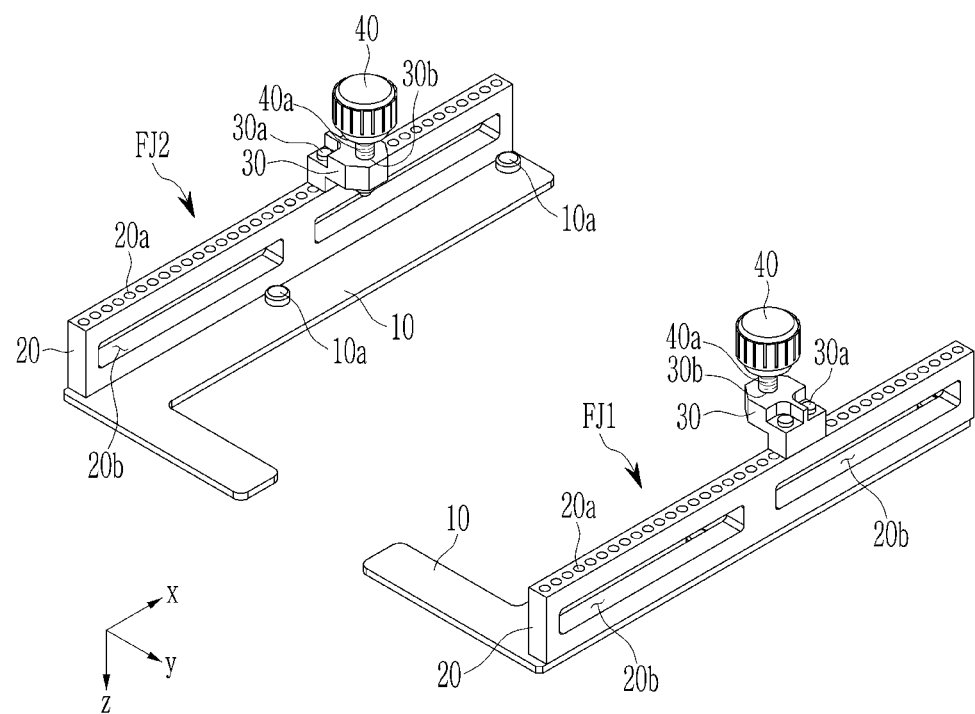
FIG. 5 is a rear perspective view of a protective sheet fixing jig shown in FIG. 4.
Figure 6:
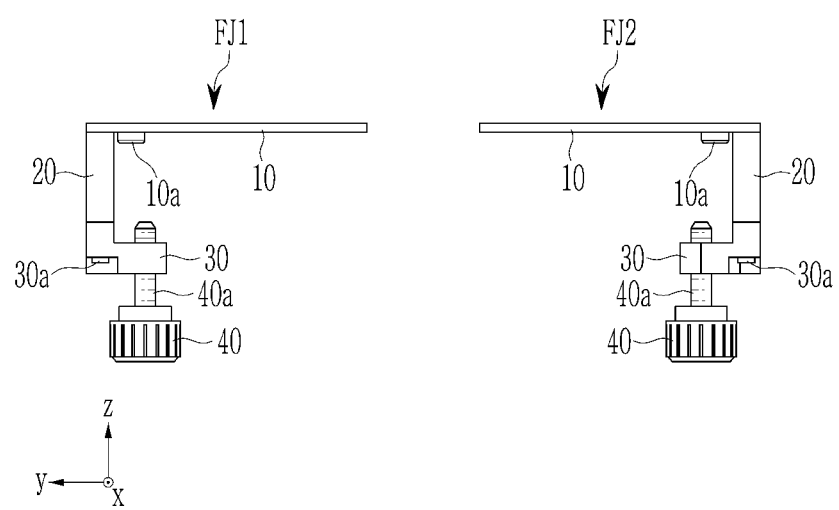
FIG. 6 is a side view of a protective sheet fixing jig shown in FIG. 4.
Figure 7:
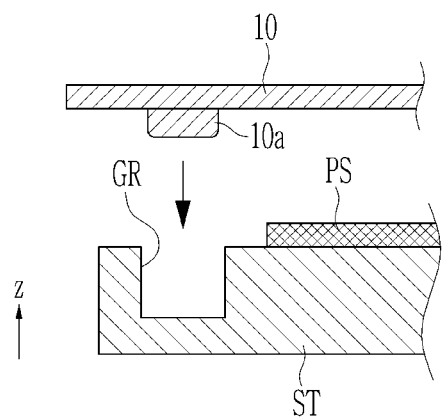
FIG. 7 is a view schematically showing a process of mounting a protective sheet fixing jig.

FIG. 2 is a perspective view showing an embodiment of a stage and a protective sheet fixing jig disposed (e.g., mounted) on a stage in an AVI device. FIG. 3 is a perspective view showing a stage except for a protective sheet fixing jig in FIG. 2. FIG. 4 is a perspective view showing a protective sheet fixing jig separated from FIG. 2, FIG. 5 is a rear perspective view of a protective sheet fixing jig shown in FIG. 4, and FIG. 6 is a side view of a protective sheet fixing jig shown in FIG. 4. FIG. 7 is a view schematically showing a process of mounting a protective sheet fixing jig.

Referring to FIG. 2 and FIG. 3, a protective sheet PS may be disposed on a stage ST.

The stage ST may be porous, and the display device placed thereon may be vacuum adsorbed. The stage ST may have a flat shape of a quadrangle or a rectangle. A stage ST may have four edges corresponding to the four sides of a quadrangle or rectangle. A groove GR may be defined in the edge of the stage ST. The groove GR may be a count bore. One or more (e.g., two) grooves GR may be provided to each facing the edge of the stage ST.

The protective sheet PS may be provided to prevent the display device or the stage from being damaged when the display device is placed on the stage ST (e.g., to prevent stamping of the display device). The protective sheet PS may be a breathable material such as non-woven fabric so that the stage ST may vacuum adsorb the display device. In addition, it may be advantageous for the protective sheet PS to have durability such as impact resistance, chemical resistance, and wear resistance. The protective sheet PS may be an ultra-high molecular weight polyethylene sheet. In an embodiment, the protective sheet PS may be one of a trade name SUNMAP™ of Nitto Denco, for example. The protective sheet PS may have a flat shape similar to that of the stage ST. In an embodiment, the protective sheet PS may have a flat shape of a quadrangle or a rectangle, for example. The protective sheet PS may have four edges corresponding to four sides of a quadrangle or a rectangle.

To prevent the protective sheet PS from moving or floating on the stage ST, the protective sheet PS may be fixed by protective sheet fixing jigs FJ1 and FJ2 (hereinafter, also simply referred to as "fixing jigs"). The fixing jigs FJ1 and FJ2 may adhere to the edge of the protective sheet PS to the stage ST. The fixing jigs FJ1 and FJ2 may include a first fixing jig FJ1 and a second fixing jig FJ2 respectively fixing the facing first edge and second edge of the protective sheet PS. The first fixing jig FJ1 and the second fixing jig FJ2 may partially fix the third edge between the first edge and the second edge of the protective sheet PS. In an embodiment, the first fixing jig FJ1 may fix the third edge part adjacent to the first edge of the protective sheet PS, and the second fixing jig FJ2 may fix the third edge part adjacent to the second edge of the protective sheet PS, for example. The fourth edge facing the third edge of the protective sheet PS may not be fixed by the fixing jig FJ1, and FJ2.

Referring to FIG. 4, FIG. 5, and FIG. 6, the first fixing jig FJ1 and the second fixing jig FJ2 may be separated from each other. The first fixing jig FJ1 and the second fixing jig FJ2 may have a structure that is symmetrical with respect to the first direction x. The first fixing jig FJ1 and the second fixing jig FJ2 may include an upper plate 10, a post 20, a bracket 30, and a knob 40, respectively.

The upper plate 10 may be disposed on the stage ST and the protective sheet PS to press the protective sheet PS. The upper plate 10 may tightly fix the protective sheet PS to the stage ST. The upper plate 10 of the first fixing jig FJ1 may press the first edge and the third edge of the protective sheet PS, and the upper plate 10 of the second fixing jig FJ2 may press the second edge and the third edge of the protective sheet PS.

The upper plate 10 may be flat as a whole, and the planar shape may be approximately L-shaped. The upper surface of the upper plate 10 may be substantially parallel to the upper surface of the stage ST. At least one location pin (location pin) 10a may be formed on the lower surface of the upper plate 10.

The location pin 10a may protrude downward from the lower surface of the upper plate 10. As shown in FIG. 7, the location pin 10a may be inserted into a groove GR defined at the edge of the stage ST. In the illustrated embodiment, two grooves GR are defined in both edges of the stage ST, respectively, and two location pins 10a of each fixing jigs FJ1 and FJ2 are inserted into the corresponding groove GR. Accordingly, the upper plate 10 may be accurately placed in a predetermined position, and the upper plate 10 may be prevented from being separated or shaken when and after mounting the fixing jigs FJ1 and FJ2.

The post 20 may extend downward from the upper plate 10. The post 20 may connect the upper plate 10 and the bracket 30 in the thickness direction of the stage ST. The post 20 may be a long and thin quadrangle as a whole. The upper end of the post 20 may adhere to the lower surface of the upper plate 10. The post 20 may have a thickness approximately corresponding to the thickness of the stage ST. The post 20 may be connected with the upper plate 10 by a fastening member 10b. The fastening member 10b may be a screw or a bolt, for example, and may be inserted and fastened to a corresponding hole of the post 20 while passing through a hole in the upper plate 10. When viewed from the side, the post 20 may be approximately perpendicular to the upper plate 10. Unlike shown, the post 20 may be unitary with the upper plate 10.

Fastening holes 20a may be defined in the lower surface of the post 20. An interval between the fastening holes 20a may be constant or may not be constant. A fastening member 30a for coupling the bracket 30 with the post 20 may be inserted into at least one fastening hole 20a. An opening 20b extending in the length direction of the post 20 may be defined between the upper and lower surfaces of the post 20. By defining the opening 20b, the weight of the post 20 and the fixing jigs FJ1 and FJ2 may be reduced.

The bracket 30 may be protruded in a direction approximately parallel to the second direction y from the post 20. The bracket 30 may face the upper plate 10. The bracket 30 may be disposed below the stage ST. The bracket 30 may be coupled to the post 20 by the fastening member 30a. The fastening member 30a may be a screw or a bolt, e.g., and may be inserted into the fastening hole 20a of the post 20 while penetrating through a hole defined in the bracket 30. Since a plurality of fastening holes 20a is defined in the post 20, the position where the bracket 30 is connected with the post 20 may be appropriately changed. In an embodiment, by adjusting the position of the bracket 30 so that the knob 40 may be disposed to prevent interference between a structure (e.g., a stage driving unit SD) under the stage ST and the knob 40 from occurring, the operation of the knob 40 may be possible or easy, for example. A fastening hole 30b may be defined in the bracket 30 in the third direction z corresponding to the thickness direction of the stage ST, and a screw thread may be formed in the interior circumference of the fastening hole 30b.

The knob 40 may be a fixing unit for fixing the fixing jigs FJ1 and FJ2 to the stage ST. The knob 40 may include an adjusting screw 40a having a thread formed on an external circumferential surface. The adjusting screw 40a may be fastened to the fastening hole 30b of the bracket 30. By rotating the knob 40, the adjusting screw 40a may be tightened or loosened. In an embodiment, when the turning knob 40 is rotated in a clockwise direction the adjusting screw 40a may be advanced toward the stage ST, and when the turning knob 40 is rotated in a counterclockwise direction, the adjusting screw 40a may move backward away from the stage ST, for example. By rotating the knob 40, the end of the adjusting screw 40a may move in the third direction z to press the lower surface of the stage ST. Accordingly, the upper plate 10 may press the protective sheet PS, and the protective sheet PS may be fixed by adhering the protective sheet PS to the stage ST.

To explain the process of fixing the protective sheet PS to the stage ST, the protective sheet PS may be first placed on the stage ST. Then, the fixing jigs FJ1 and FJ2 may be disposed so that the location pin 10a of the fixing jigs FJ1 and FJ2 is inserted into the groove GR defined in both edges of the stage ST.

Since the location pin 10a of the fixing jig FJ1, and FJ2 is inserted into the groove GR of the stage ST, the fixing jig FJ1, and FJ2 may be quickly and accurately disposed. At this time, the upper plate 10 of the fixing jigs FJ1 and FJ2 may overlap the edge of the protective sheet PS and the edge of the stage ST, and the post 20 of the fixing jigs FJ1 and FJ2 may be disposed on the side of the stage ST, while the fixing Bracket 30 and the knob 40 of the jig FJ1 and FJ2 may be disposed under the stage ST. Then, the stage ST and the protective sheet PS may be clamped by turning the knob 40. The protective sheet PS may be adhered and fixed to the stage ST by the pressure generated by the clamping.

An adhesive tape may be used to fix the protective sheet PS. In an embodiment, the protective sheet PS may be fixed to the stage ST by attaching the adhesive tape to cover both edges of the protective sheet PS and the corresponding edges of the stage ST, for example. When using the adhesive tape, problems such as stickiness due to the adhesive, lifting of the protective sheet PS, and scattering of pieces of the adhesive tape may occur, and tools (e.g., a knife, scissors, etc.) are desired to cut the adhesive tape. In addition, when replacing the protective sheet PS, it may take a considerable time (e.g., within about 10 minutes) to remove the adhesive tape and cut and attach a new adhesive tape.

As in the embodiment, when fixing the protective sheet PS by the fixing jigs FJ1 and FJ2, the problems that occur when using the adhesive tape may be prevented. In addition, since the protective sheet PS may be replaced by simply rotating the knob 40, the use of the tools is not desired and the replacement time of the protective sheet PS may be reduced (e.g., within about 2 minutes). Considering the number of the entirety of the stages ST included in the AVI device, this may drastically reduce the maintenance/repair time of the AVI device. In addition, since there is no problem that is difficult to be regularized when using the adhesive tape, it is possible to set the replacement cycle of protective sheet PS and standardize the fixation of the protective sheet PS.

FIG. 8, FIG. 9, FIG. 10, and FIG. 11 are a side view of an embodiment of a protective sheet fixing jig in an embodiment, respectively. The differences from the above-described embodiment will be mainly explained.

Figure 8:
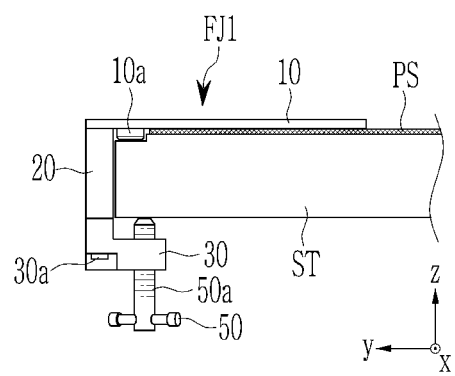
FIG. 8 is a side view of an embodiment of a protective sheet fixing jig.

Referring to FIG. 8, the first fixing jig FJ1 in an embodiment may include a vise handle 50 as a means for tightening or loosening the adjusting screw 50a fastened to the fastening hole 30b formed in the bracket 30. That is, the first fixing jig FJ1 may include a vise handle 50 that is a sliding bar instead of the knob 40 of the aforementioned embodiment. An eye bolt may be used instead of the adjusting screw 50a, and the eye bolt may be tightened or loosened by inserting the vise handle 50 into the ring of the eye bolt. The vise handle 50 may have poor maneuverability compared to the knob 40, but it may be advantageous in space utilization. In an embodiment, when the space under the stage ST is too narrow to apply the knob 40, the workability may be improved by applying the vise handle 50, for example. Although not shown, the second fixing jig FJ2 may have substantially the same structure as the first fixing jig FJ1. One of the first and second fixing jigs FJ1 and FJ2 may include the vise handle 50 as a fixing part, and the other may include the knob 40 as a fixing part.

Figure 9:
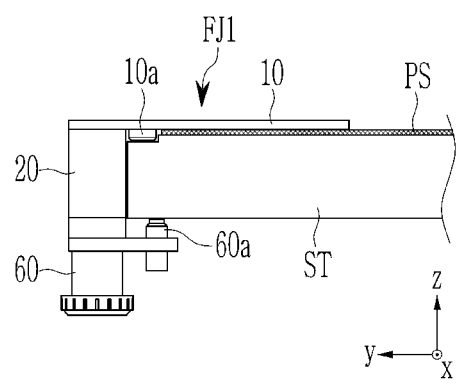
FIG. 9 is a side view of an embodiment of a protective sheet fixing jig.

Referring to FIG. 9, the first fixing jig FJ1 in an embodiment may include a spring clamp 60 as a fastening means. The spring clamp 60 may include a front bolt 60a that presses the lower surface of the stage ST. The spring clamp 60 may be fastened quickly, but it may be structurally more complicated than the knob 40 and precise setting may be difficult. Although not shown, the second fixing jig FJ2 may have substantially the same structure as the first fixing jig FJ1. One of the first and second fixing jigs FJ1 and FJ2 may include the spring clamp 60 as a fixing part, and the other may include the knob 40 or the vise handle 50 as a fixing part.

Figure 10:
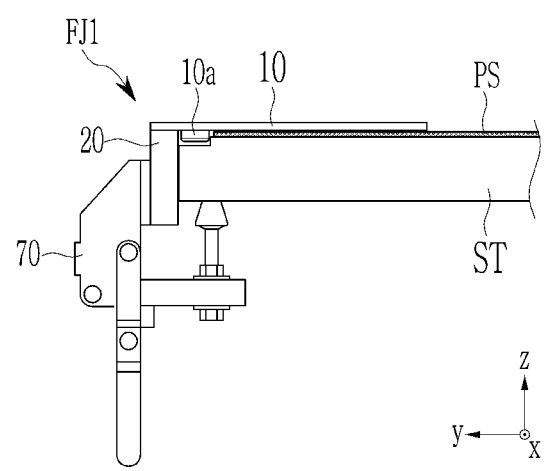
FIG. 10 is a side view of an embodiment of a protective sheet fixing jig.

Referring to FIG. 10, the first fixing jig FJ1 may include a toggle clamp 70 as a fastening means. Since the toggle clamp 70 may be fastened with one stroke, it may be fastened faster than the knob 40, but it may be difficult to operate the lever when the space under the stage ST is narrow. Although not shown, the second fixing jig FJ2 may have substantially the same structure as the first fixing jig FJ1. One of the first and second fixing jigs FJ1, and FJ2 may include the toggle clamp 70 as a fixing part, and the other may include the knob 40, the vise handle 50, or the spring clamp 60 as a fixing part.

Figure 11:
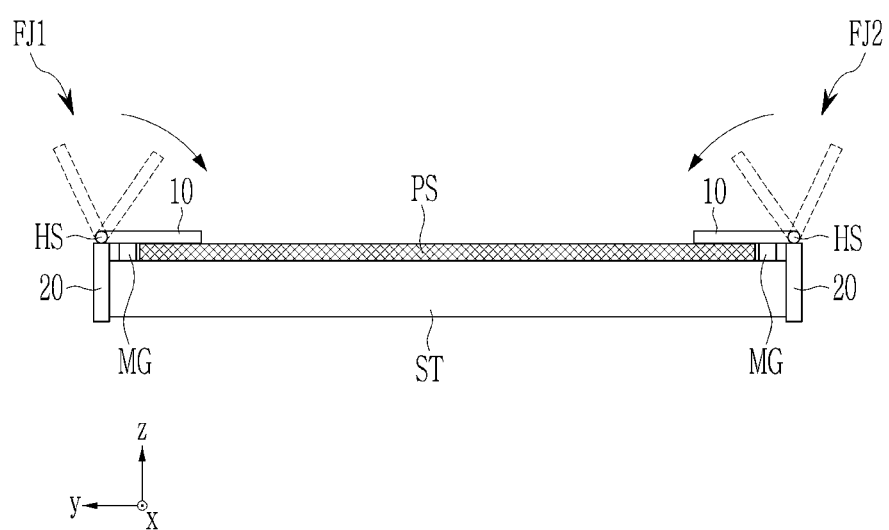
FIG. 11 is a side view of an embodiment of a protective sheet fixing jig.

Referring to FIG. 11, the fixing jigs FJ1 and FJ2 are hinged with the upper plate 10 and the post 20. The post 20 may be fixed to the side of the stage ST by a fastening means such as a screw, and the upper plate 10 may be rotated from the open state to the closed state or vice versa around the hinge axis HS. A magnet MG for fixing the upper plate 10 may be installed on the stage ST so that the upper plate 10 may press the protective sheet PS in a state where the upper plate 10 is disposed on the protective sheet PS (the closed state), and the upper plate 10 may include metals such as iron, nickel, and cobalt. In order for the upper plate 10 to press the protective sheet PS, a hinge (e.g., a spring hinge) that automatically rotates the upper plate 10 to the closed state may be used instead of the magnet MG or together with the magnet MG.

Figure 12:
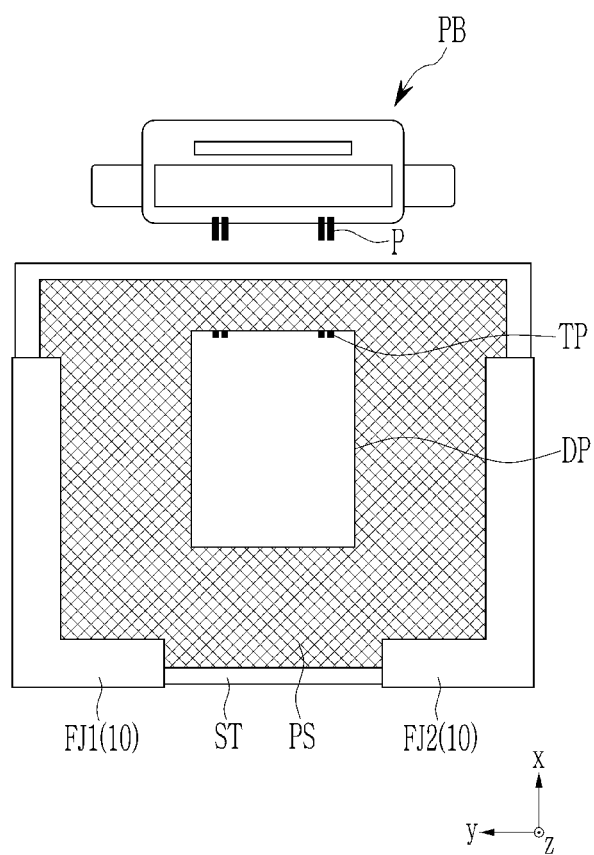
FIG. 12 is a top plan view of an embodiment of a stage.

FIG. 12 is a top plan view of an embodiment of a stage.

Referring to FIG. 12, a pin board PB is shown along with the stage ST. The pin board PB may be disposed adjacent to the stage ST. A protective sheet PS may be disposed on the stage ST, and a display panel DP that is an inspection target may be loaded on the protective sheet PS. The fixing jigs FJ1 and FJ2 may be fastened to both edges that do not face the pin board PB among the edges of the stage ST. The upper plate 10 of the fixing jigs FJ1 and FJ2 may be fixed by pressing at least a part of each of three edges that are not adjacent to the pin board PB among four edges of the protective sheet PS. This is because, when the upper plate 10 of the fixing jigs FJ1 and FJ2 fixes the edge of the protective sheet PS adjacent to the pin board PB, it may be difficult to connect the pin board PB. The display panel DP may be vacuum adsorbed on the stage ST. Since the protective sheet PS is disposed between the stage ST and the display panel DP, the display panel or the stage may be prevented from being damaged during the loading of the display panel DP or the inspection of the display panel DP.

The stage ST and the pin board PB may move so that the pin P of the pin board PB may contact the test pad TP of the display panel DP. In an embodiment, the stage ST may move in the first direction x and/or second direction y, and the pin board PB may move in the third direction z, for example. The pin board PB may drive the display panel DP by applying a signal to the test pad TP of the display panel DP through a pin P, and one of the aforementioned inspection units OS1 to OS5 may perform a predetermined inspection. The AVI device may proceed with the inspection by the other inspection units OS1 to OS5 while moving the stage ST to the target position.

Hereinafter, a display device that may be inspected in the aforementioned AVI device will be briefly described.

Figure 13:
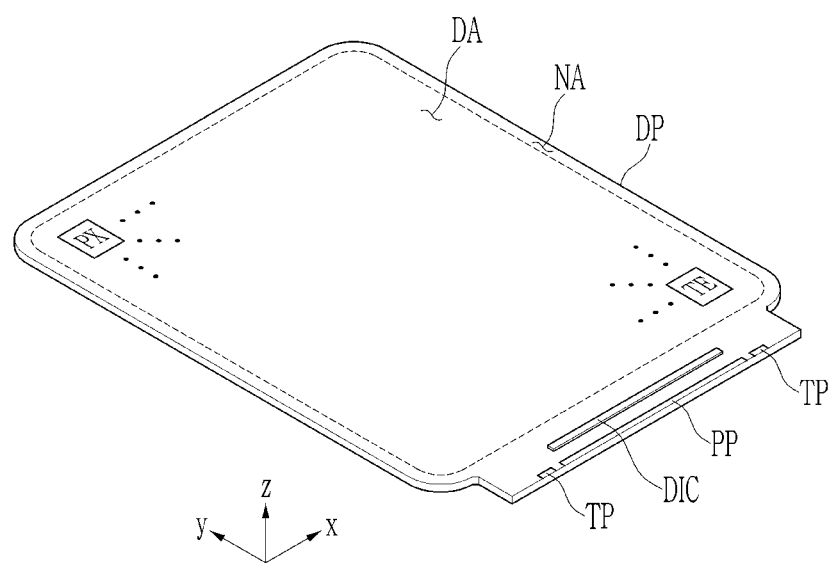
FIG. 13 is a perspective view schematically showing an embodiment of a display device.

FIG. 13 is a perspective view schematically showing an embodiment of a display device.

Referring to FIG. 13, the display device may be used to display images on electronic devices such as mobile phones, smart phones, tablets, laptop computers, monitors, multimedia players, and game consoles. The display device may include a display panel DP, a drive integrated circuit chip DIC, or the like.

The display panel DP may include a display area DA corresponding to a screen on which the image is displayed and a non-display area NA where circuits and/or signal lines for generating and/or transmitting various signals applied to the display area DA are disposed. The non-display area NA may surround the display area DA. In FIG. 13, the inner and outer sides of the dotted line quadrangle may correspond to the display area DA and the non-display area NA, respectively.

In the display area DA of the display panel DP, pixels PX may be disposed in a matrix. However, the disclosure is not limited thereto, and the pixels PX may be disposed in various other forms. In addition, signal lines such as a gate line (also referred to as a scan line), a data line, and a driving voltage line may be disposed in the display area DA. The gate line may extend approximately in the first direction x, and the data line and the driving voltage line may extend approximately in the second direction y. The gate line, the data line, the driving voltage line, etc. are connected to each pixel PX, and each pixel PX may receive a gate signal (also referred to as a scan signal), a data voltage, a driving voltage, etc. from these signal lines. Each pixel PX may include a light-emitting device such as a light-emitting diode LED and a pixel circuit connected thereto. The pixel circuit unit may generate a driving current based on signals applied through the signal lines such as the gate line and the data line to be applied to the light-emitting device.

In the display area DA, touch electrodes TE for detecting a user's contact and/or a non-contact touch may be disposed. The touch electrodes TE may sense a touch by a mutual sensing capacitor method and/or a self-sensing capacitor method. Although the display area DA that is generally shown as a quadrangle, the display area DA may have various shapes such as a polygon, a circle, and an ellipse other than the quadrangle.

A pad portion PP in which pads for receiving signals from the outside of the display panel DP are arranged may be disposed in the non-display area NA of the display panel DP. The pad portion PP may be disposed long in the first direction x along one edge of the display panel DP. A flexible printed circuit film (not shown) may be bonded to the pad portion PP, and the pads of the flexible printed circuit film may be electrically connected to the pads of the pad portion PP.

In the non-display area NA of the display panel DP, test pads TP may be disposed on opposite sides or one side of the pad portion PP. The pins P of the pin board PB described above may be connected to the test pads TP, and the AVI device may apply signals for inspecting the display device to the display device through the pins P of the pin board PB and the test pads TP.

A driving unit that generates and/or processes various signals for driving the display panel DP may be disposed in the non-display area NA of the display panel DP. The driving unit includes a data driver that applies a data voltage to the data lines, a gate driver that applies a gate signal to the gate lines, and a signal controller that controls the data driver and gate driver. The pixels PX may receive the data voltage at predetermined timing according to the gate signal generated by the gate driver. The gate driver may be integrated into the display panel DP and may be disposed on at least one side of the display area DA. The data driver and the signal controller may be provided as a drive integrated circuit chip DIC, and the drive integrated circuit chip DIC may be disposed (e.g., mounted) on the non-display area NA of the display panel DP. The drive integrated circuit chip DIC may be disposed (e.g., mounted) on a flexible printed circuit film or the like and electrically connected to the display panel DP.

Figure 14:
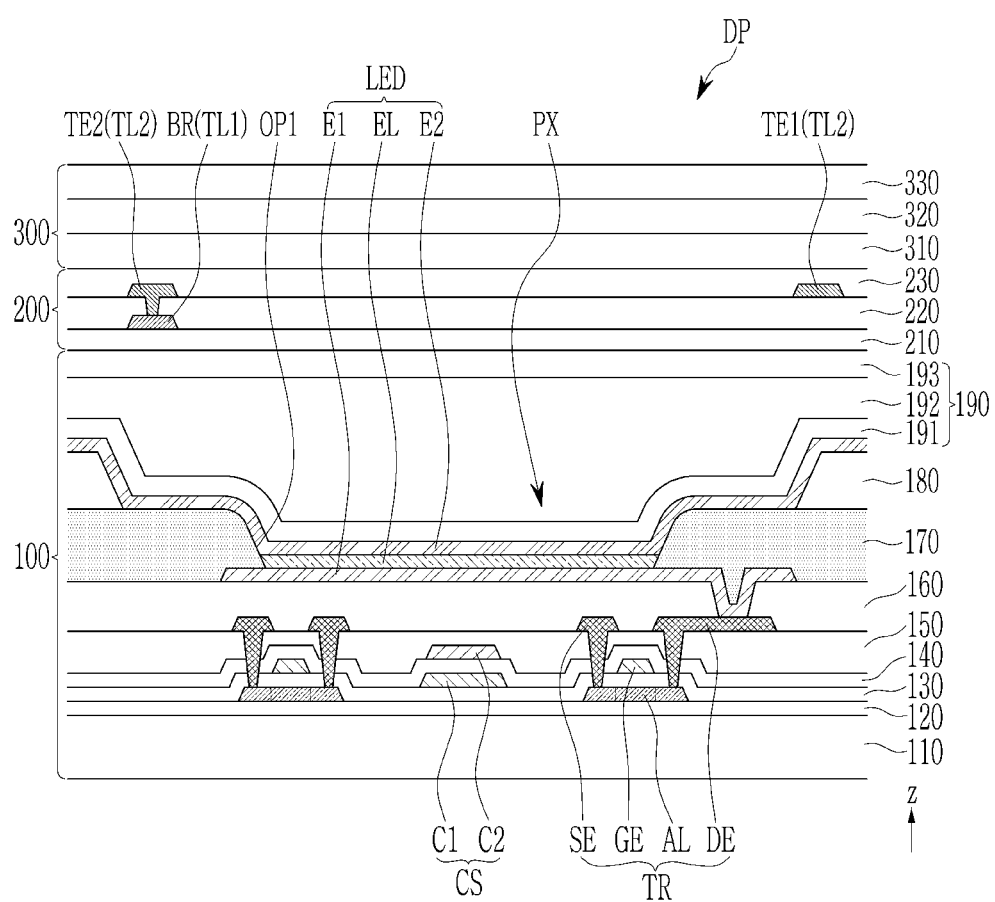
FIG. 14 is a schematic cross-sectional view of an embodiment of a display panel.

FIG. 14 is a schematic cross-sectional view of an embodiment of a display panel.

Referring to FIG. 14, the display panel DP may include a display unit 100, a touch unit 200, and an anti-reflection unit 300.

The display unit 100 may basically include a substrate 110, a transistor TR formed on the substrate 110, and a light-emitting diode LED connected to the transistor TR. A light-emitting diode LED may correspond to the pixel PX.

The substrate 110 may be a flexible substrate including a polymer such as a polyimide, a polyamide, or polyethylene terephthalate. The substrate 110 may include a barrier layer to prevent penetration of moisture, etc., and the barrier layer may include an inorganic insulating material such as a silicon nitride (SiN$_x$), a silicon oxide (SiO$_x$), or a silicon oxynitride (SiO$_x$N$_y$). The substrate 110 may be a rigid substrate including glass.

A buffer layer 120 may be disposed on top of the substrate 110. When the semiconductor layer AL is formed, the buffer layer 120 blocks impurities from the substrate 110 to improve the characteristics of the semiconductor layer AL, and flattens the surface of the substrate 110 to relieve a stress of the semiconductor layer AL. The buffer layer 120 may include an inorganic insulating material such as a silicon nitride, a silicon oxide, and a silicon oxynitride. The buffer layer 120 may include amorphous silicon.

A semiconductor layer AL may be disposed on the buffer layer 120. The semiconductor layer AL may include a first region, a second region, and a channel region between these regions. The semiconductor layer AL may include polysilicon, amorphous silicon, and/or an oxide semiconductor.

A first gate insulating layer 130 may be disposed on the semiconductor layer AL. The first gate insulating layer 130 may include an inorganic insulating material such as a silicon oxide, a silicon nitride, and a silicon oxynitride, and may have a single layer or multiple layers.

A first gate conductive layer that may include a gate electrode GE may be disposed on the first gate insulating layer 130. The first gate conductive layer may include molybdenum (Mo), aluminum (Al), copper (Cu), titanium (Ti), tungsten (W), or the like, and may be a single layer or multilayer.

A second gate insulating layer 140 may be disposed on the first gate conductive layer. The second gate insulating layer 140 may include an inorganic insulating material such as a silicon nitride, a silicon oxide, or a silicon oxynitride, and may have a single layer or multiple layers.

A second gate conductive layer that may include a second electrode C2 of a storage capacitor CS may be disposed on the second gate insulating layer 140. The second electrode C2 may overlap the first electrode C1, and the first electrode C1, the second electrode C2, and the second gate insulating layer 140 between them may constitute a storage capacitor CS. The second gate conductive layer may include molybdenum (Mo), aluminum (Al), copper (Cu), titanium (Ti), tungsten (W), or the like, and may be a single layer or a multilayer.

An inter-insulating layer 150 may be disposed on the second gate conductive layer. The inter-insulating layer 150 may include an inorganic insulating material such as a silicon nitride, a silicon oxide, or a silicon oxynitride, and may be a single layer or multiple layers. When the inter-insulating layer 150 is multi-layered, a lower layer may include a silicon nitride and an upper layer may include a silicon oxide.

On the inter-insulating layer 150, a first data conductive layer that may include a first electrode SE and a second electrode DE of the transistor TR may be disposed. One of first electrode SE and the second electrode DE may be a source electrode of a transistor TR and the other may be a drain electrode of the transistor TR. The first data conductive layer may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), copper (Cu), etc., and may be a single layer or multiple layers. In an embodiment, the first data conductive layer may have a triple layer structure such as titanium (Ti)-aluminum (Al)-titanium (Ti), or a double layer structure such as titanium (Ti)-copper (Cu), for example.

A planarization layer 160 may be disposed on the first data conductive layer. The planarization layer 160 may include an organic insulating material such as general-purpose polymers such as poly(methyl methacrylate) and polystyrene, polymer derivatives having phenolic groups, acryl-based polymers, imide-based polymers (e.g., polyimide), or siloxane-based polymers.

A pixel electrode E1 of the light-emitting diode LED may be disposed on the planarization layer 160. The pixel electrode E1 may be connected to the second electrode DE through a contact hole defined in the planarization layer 160. The pixel electrode E1 may include or consist of a reflective conductive material or a semi-transmissive conductive material, or may also include or consist of a transparent conductive material. The pixel electrode E1 may include a transparent conductive material such as an indium tin oxide ("ITO") or an indium zinc oxide ("IZO"). The pixel electrode E1 may include a metal such as lithium (Li), calcium (Ca), aluminum (Al), silver (Ag), magnesium (Mg), or gold (Au). The pixel electrode E1 may have a multi-layered structure, and for example, may have a three-layered structure such as ITO-silver (Ag)-ITO.

A partition (170, also referred to as a pixel definition layer or a bank) in which an opening OP1 overlapping the pixel electrode E1 is defined may be disposed on the planarization layer 160. The partition 170 may define a light-emitting region. The partition 170 may include an organic insulating material such as acryl-based polymer, an imide-based polymer (e.g., polyimide), or an amide-based polymer (e.g., polyamide). The partition 170 may be a black partition including a colored pigment such as a black pigment or a blue pigment. In an embodiment, partition 170 may include a pigment in which a polyimide binder and red, green, and blue are mixed, for example. In an embodiment, the partition 170 may include a combination of a cardo binder resin and a lactam black pigment and blue pigment, for example. The partition 170 may include carbon black. The black partition may improve a contrast ratio and prevent a reflection by the underlying metal layer.

Above the pixel electrode E1, an emission layer EL may be disposed. At least part of the emission layer EL may be disposed within the opening OP1. The emission layer EL may include a material layer that uniquely emits light of basic colors such as red, green, and blue. The emission layer EL may have a structure in which material layers emitting light of different colors are stacked. On the pixel electrode E1, in addition to the emission layer EL, at least one of a hole injection layer, a hole transport layer, an electron transport layer, and an electron injection layer may be disposed.

Above the partition 170, a spacer 180 may be disposed. The spacer 180 may include an organic insulating material such as an acryl-based polymer, an imide-based polymer, or an amide-based polymer.

A common electrode E2 may be disposed on the emission layer EL and the partition 170. The common electrode E2 may be disposed over a plurality of pixels PX. The common electrode E2 may include a metal such as calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), or lithium (Li). The common electrode E2 may include a transparent conductive oxide ("TCO") such as an indium tin oxide ("ITO") or an indium zinc oxide ("IZO").

The pixel electrode E1, the emission layer EL, and the common electrode E2 may constitute the light-emitting diode LED, which may be an organic light-emitting diode.

The pixel electrode E1 may be an anode, which is a hole injection electrode, and the common electrode E2 may be a cathode, which is an electron injection electrode, or vice versa. The opening OP1 of the partition 170 may correspond to a light-emitting region of the light-emitting diode LED.

An encapsulation layer 190 may be disposed on the common electrode E2. The encapsulation layer 190 may seal the light-emitting diodes LED and may prevent penetration of moisture or oxygen from the outside. The encapsulation layer 190 may be a thin film encapsulation layer including at least one inorganic layer and at least one organic layer stacked on the common electrode E2. In an embodiment, the encapsulation layer 190 may have a triple layer structure of a first inorganic layer 191, an organic layer 192, and a second inorganic layer 193, for example.

A first insulating layer 210 of the touch unit 200 may be disposed on the encapsulation layer 190. The first insulating layer 210 may cover the encapsulation layer 190 to protect the encapsulation layer 190 and prevent moisture permeation. The first insulating layer 210 may reduce a parasitic capacitance between the common electrode E2 and the touch electrodes TE1 and TE2.

A first touch conductive layer TL1 that may include a bridge BR may be disposed on the first insulating layer 210. A second insulating layer 220 may be disposed on the first touch conductive layer TL1. A second touch conductive layer TL2 that may include touch electrodes TE1 and TE2 may be disposed on the second insulating layer 220. A passivation layer 230 may be disposed on the second touch conductive layer TL2. The touch electrodes TE1 and TE2 may include a first touch electrode TE1 and a second touch electrode TE2 forming a mutual sensing capacitor. The bridge BR may electrically connect the second touch electrodes TE2. In an embodiment, the second touch electrodes TE2 adjacent to each other and separated from each other are connected to the bridge BR through contact holes defined in the second insulating layer 220 and electrically connected through the bridge BR, for example.

The first insulating layer 210 and the second insulating layer 220 may include inorganic insulating materials such as a silicon nitride, a silicon oxide, and a silicon oxynitride, and may be a single layer or multiple layers. The passivation layer 230 may include organic insulating materials such as acryl-based polymers and imide-based polymers, or inorganic insulating materials such as a silicon nitride, a silicon oxide, and a silicon oxynitride.

An opening overlapping a light-emitting region of the light-emitting diode LED may be defined in the first touch conductive layer TL1 and the second touch conductive layer TL2. The first touch conductive layer TL1 and the second touch conductive layer TL2 may include metals such as aluminum (Al), copper (Cu), titanium (Ti), molybdenum (Mo), silver (Ag), chromium (Cr), or nickel (Ni), and may be a single layer or multiple layers. In an embodiment, the first touch conductive layer TL1 and/or the second touch conductive layer TL2 may have a triple layer structure such as titanium (Ti)/aluminum (Al)/titanium (Ti), for example.

A reflection preventing unit 300 may be disposed on the passivation layer 230. The reflection preventing unit 300 may include a first phase retardation layer 310, a second phase retardation layer 320, and a polarization layer 330 sequentially disposed on the passivation layer 230. The reflection preventing unit 300 may be implemented in a combination of a color filter and a light-blocking member, a combination of reflective layers causing destructive interference, or the like.

The structure of the display panel DP may be changed in various ways. In an embodiment, the display panel DP may not include some of the aforementioned elements and/or layers, or may further include elements and/or layers different from those described above, for example.

While this disclosure has been described in connection with what is presently considered to be embodiments, it is to be understood that the inventive concept is not limited to the disclosed embodiments. On the contrary, it is intended to cover various modifications and equivalent arrangements included within the spirit and scope of the appended claims.

What is claimed is:

1. A protective sheet fixing jig for fixing a protective sheet placed on a stage, the protective sheet fixing jig comprising:
    an upper plate which presses the protective sheet on the stage and tightly fixes the protective sheet to the stage;
    a post disposed at a side of the stage and connected with the upper plate;
    a bracket facing the upper plate and connected with the post; and
    a fixing part which is fastened to the bracket and presses a lower surface of the stage.

2. The protective sheet fixing jig of claim 1, wherein the upper plate has an L-shaped plane shape.

3. The protective sheet fixing jig of claim 1, wherein a plurality of fastening holes is defined in a lower surface of the post, and
    the protective sheet fixing jig further comprises a fastening member that passes through a hole defined in the bracket and is fastened to one of the plurality of fastening holes.

4. The protective sheet fixing jig of claim 1, further comprising
    a location pin protruded downward from a lower surface of the upper plate and inserted into a groove defined at an edge of the stage.

5. The protective sheet fixing jig of claim 1, further comprising a first fixing jig and a second fixing jig respectively fixing a first edge of the protective sheet and a second edge of the protective sheet opposite to the first edge of the protective sheet,
    wherein the first fixing jig and the second fixing jig each include the upper plate, the post, the bracket, and the fixing part.

6. The protective sheet fixing jig of claim 5, wherein the upper plate of the first fixing jig and the upper plate of the second fixing jig press a third edge of the protective sheet between the first edge and the second edge of the protective sheet.

7. The protective sheet fixing jig of claim 6, wherein the upper plate of the first fixing jig and the upper plate of the second fixing jig do not press a fourth edge of the protective sheet opposite to the third edge of the protective sheet.

8. The protective sheet fixing jig of claim 1, wherein a fastening hole is defined in the bracket in a thickness direction of the stage, and
    the fixing part includes a knob including an adjusting screw fastened to the fastening hole.

9. The protective sheet fixing jig of claim 8, wherein when the adjusting screw is rotated, an end of the adjusting screw moves in the thickness direction of the stage and presses the lower surface of the stage.

10. The protective sheet fixing jig of claim 1, wherein a fastening hole is defined in the bracket in a thickness direction of the stage, and the fixing part includes a vise handle including an adjusting screw fastened to the fastening hole.

11. An auto visual inspection device comprising:
a turntable;
a plurality of inspection units disposed around the turntable;
a plurality of stages disposed on the turntable;
a protective sheet disposed on each of the plurality of stages; and
a protective sheet fixing jig which fixes the protective sheet, the protective sheet fixing jig including:
  an upper plate which presses the protective sheet on a stage of the plurality of stages and tightly fixes the protective sheet to the stage;
  a post disposed at a side of the stage and connected with the upper plate;
  a bracket facing the upper plate and connected with the post; and
  a fixing part which is fastened to the bracket and presses a lower surface of the stage.

12. The auto visual inspection device of claim 11, wherein the upper plate has an L-shaped plane shape.

13. The auto visual inspection device of claim 11, wherein a plurality of fastening holes is defined in a lower surface of the post, and
the protective sheet fixing jig further includes a fastening member that passes through a hole defined in the bracket and is fastened to one of the plurality of fastening holes.

14. The auto visual inspection device of claim 11, wherein the protective sheet fixing jig further includes a location pin protruded downward from a lower surface of the upper plate and inserted into a groove defined at an edge of the stage.

15. The auto visual inspection device of claim 11, wherein the protective sheet fixing jig further includes a first fixing jig and a second fixing jig respectively fixing a first edge of the protective sheet and a second edge of the protective sheet opposite to the first edge of the protective sheet, and
the first fixing jig and the second fixing jig each include the upper plate, the post, the bracket, and the fixing part.

16. The auto visual inspection device of claim 15, wherein the upper plate of the first fixing jig and the upper plate of the second fixing jig press a third edge of the protective sheet between the first edge and the second edge of the protective sheet.

17. The auto visual inspection device of claim 16, further comprising
a pin board for applying signals to a test object placed on the stage, and
the upper plate of the first fixing jig and the upper plate of the second fixing jig do not press an edge of the protective sheet adjacent to the pin board.

18. The auto visual inspection device of claim 11, wherein a fastening hole is defined in the bracket in a thickness direction of the stage, and
the fixing part includes a knob including an adjusting screw fastened to the fastening hole.

19. The auto visual inspection device of claim 18, wherein when the adjusting screw is rotated, an end of the adjusting screw moves in the thickness direction of the stage and presses the lower surface of the stage.

20. The auto visual inspection device of claim 11, wherein a fastening hole is defined in the bracket in a thickness direction of the stage, and
the fixing part includes a vise handle including an adjusting screw fastened to the fastening hole.

* * * * *